US007307799B2

United States Patent
Minefuji

(10) Patent No.: US 7,307,799 B2
(45) Date of Patent: Dec. 11, 2007

(54) IMAGING OPTICAL SYSTEM

(75) Inventor: Nobutaka Minefuji, Saitama (JP)

(73) Assignee: PENTAX Corporation, Tokyo (JP)

( * ) Notice: Subject to any disclaimer, the term of this patent is extended or adjusted under 35 U.S.C. 154(b) by 236 days.

(21) Appl. No.: 11/121,024

(22) Filed: May 4, 2005

(65) Prior Publication Data
US 2005/0253952 A1    Nov. 17, 2005

(30) Foreign Application Priority Data
May 14, 2004    (JP) ............... 2004-145464

(51) Int. Cl.
G02B 9/00    (2006.01)
G02B 9/12    (2006.01)
G02B 13/18   (2006.01)

(52) U.S. Cl. ............... 359/738; 359/784; 359/716

(58) Field of Classification Search ........ 359/738–739, 359/784–785, 716
See application file for complete search history.

(56) References Cited

U.S. PATENT DOCUMENTS

| | | | |
|---|---|---|---|
| 5,251,069 A | 10/1993 | Iizuka | |
| 5,434,711 A | 7/1995 | Tetsuya et al. | |
| 5,570,235 A | 10/1996 | Yoneyama | |
| 5,973,859 A | 10/1999 | Abe | |
| 6,178,050 B1 | 1/2001 | Enomoto | |
| 6,466,377 B1 | 10/2002 | Saito et al. | |
| 6,476,982 B1 | 11/2002 | Kawakami | |
| 6,545,820 B2 | 4/2003 | Eguchi et al. | |
| 6,552,857 B2 | 4/2003 | Sensui | |
| 6,728,047 B2 * | 4/2004 | Sato et al. ............ 359/786 |
| 6,922,290 B2 | 7/2005 | Enomoto | |
| 6,977,779 B2 * | 12/2005 | Shinohara ............ 359/716 |
| 2003/0193605 A1 | 10/2003 | Yamaguchi | |
| 2004/0212901 A1 * | 10/2004 | Nanba et al. ............ 359/785 |
| 2004/0223068 A1 | 11/2004 | Kamo | |

FOREIGN PATENT DOCUMENTS

| | | |
|---|---|---|
| JP | 5-188284 | 7/1993 |
| JP | 2001-075006 | 3/2001 |
| JP | 2002-228922 | 8/2002 |
| JP | 2002-365529 | 12/2002 |
| JP | 2004-004566 | 1/2004 |
| JP | 2004-226487 | 8/2004 |

OTHER PUBLICATIONS

English Language Abstract of JP 5-188284.
English Language Abstract of JP 2001-075006.
English Language Abstract of JP 2002-228922.
English Language Abstract of JP 2004-004566.

* cited by examiner

Primary Examiner—Jordan M. Schwartz
(74) Attorney, Agent, or Firm—Greenblum & Bernstein, P.L.C.

(57) ABSTRACT

An imaging optical system includes an aperture stop, a positive first lens group, and a positive or negative second lens group. The first lens group includes a positive first lens element and a negative second lens element. The first lens element is provided with an aspherical surface on the object-side surface thereof. The aspherical surface is formed so that the higher a height from the optical axis in a radial direction becomes the more an aspherical surface at the height is displaced toward the object, compared with a paraxial spherical surface. The second lens group includes a meniscus third lens element. The meniscus third lens element is provided with an aspherical surface on each lens surface thereof, and has the convex surface facing toward the object in the vicinity of the optical axis.

7 Claims, 10 Drawing Sheets

F_{NO}= 1:2.8

-0.1  0.1
SPHERICAL
ABERRATION
CHROMATIC
ABERRATION

— d Line
······ g Line
- - - C Line

W=32.6°

-0.01  0.01
LATERAL
CHROMATIC
ABERRATION

W=32.6°

-0.1  0.1
ASTIGMATISM

— S
- - M

W=32.6°

-2.0(%)2.0
DISTORTION

FNO=1:3.5

-0.1    0.1
SPHERICAL
ABERRATION

CHROMATIC
ABERRATION

W=32.2°

-0.01   0.01
LATERAL
CHROMATIC
ABERRATION

W=32.2°

-0.1    0.1
ASTIGMATISM

W=32.2°

-2.0(%)2.0
DISTORTION

FNO=1:3.5

-0.1  0.1
SPHERICAL
ABERRATION

CHROMATIC
ABERRATION

W=29.7°

—— d Line
······ g Line
--- C Line

-0.01  0.01
LATERAL
CHROMATIC
ABERRATION

W=29.7°

—— S
--- M

-0.1  0.1
ASTIGMATISM

W=29.7°

-2.0(%)2.0
DISTORTION

F_NO=1:2.8

-0.1   0.1
SPHERICAL
ABERRATION

CHROMATIC
ABERRATION

——— dLine
········· gLine
------ CLine

W=30.6°

-0.01  0.01
LATERAL
CHROMATIC
ABERRATION

W=30.6°

-0.1   0.1
ASTIGMATISM

——— S
--- M

W=30.6°

-2.0(%)2.0
DISTORTION

Fig. 9
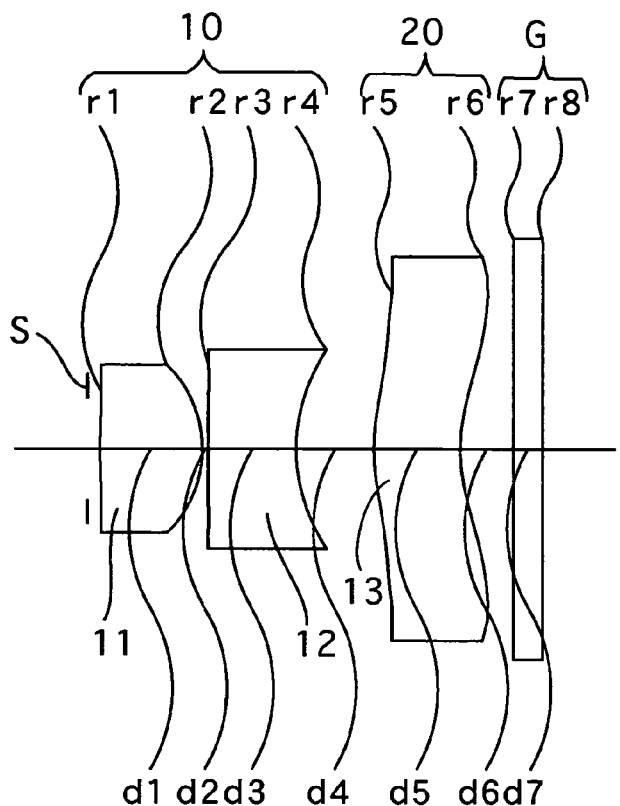
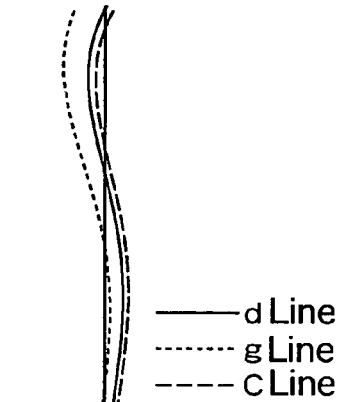
Fig.10A
FNO= 1:3.5
— d Line
······ g Line
---- C Line
-0.1   0.1
SPHERICAL
ABERRATION
CHROMATIC
ABERRATION
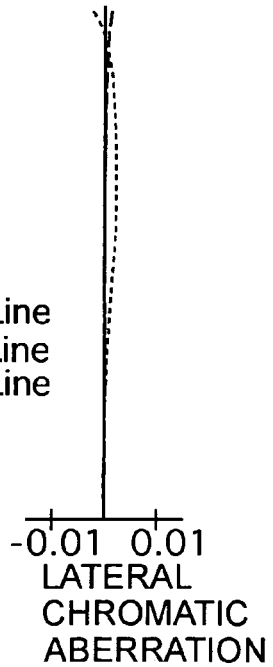
Fig.10B
W=31.2°
-0.01  0.01
LATERAL
CHROMATIC
ABERRATION
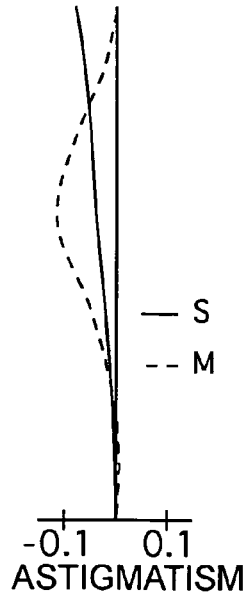
Fig.10C
W=31.2°
— S
-- M
-0.1   0.1
ASTIGMATISM
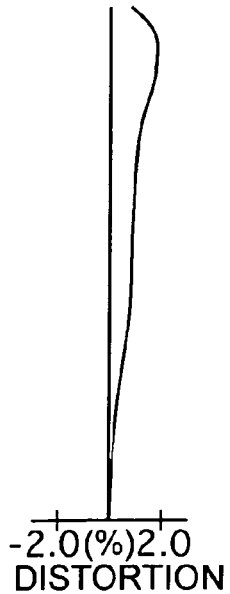
Fig.10D
W=31.2°
-2.0(%)2.0
DISTORTION Fig. 11
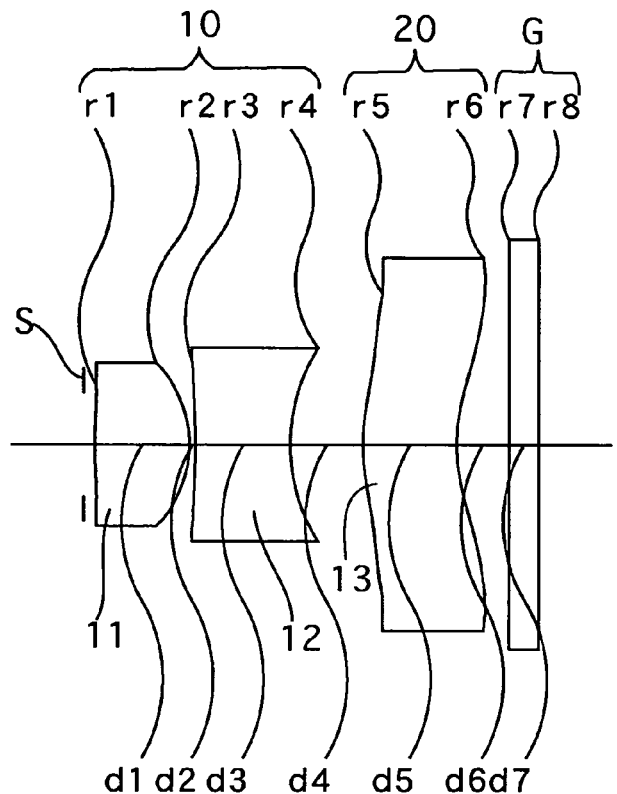
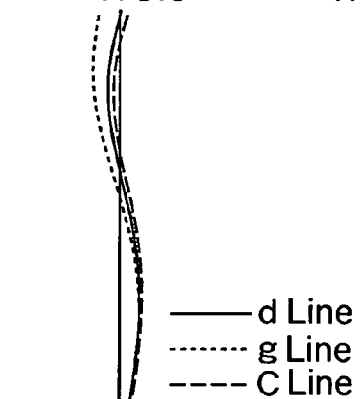
Fig.12A
FNO= 1:3.5
—— d Line
········ g Line
---- C Line
-0.1  0.1
SPHERICAL
ABERRATION
CHROMATIC
ABERRATION
Fig.12B
W=30.3°
-0.01  0.01
LATERAL
CHROMATIC
ABERRATION
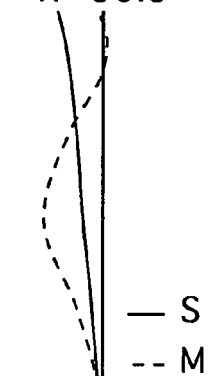
Fig.12C
W=30.3°
— S
-- M
-0.1  0.1
ASTIGMATISM
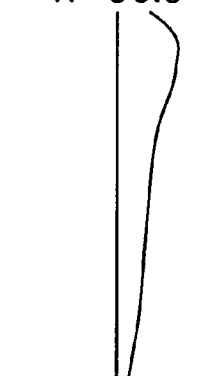
Fig.12D
W=30.3°
-2.0(%)2.0
DISTORTION Fig. 13
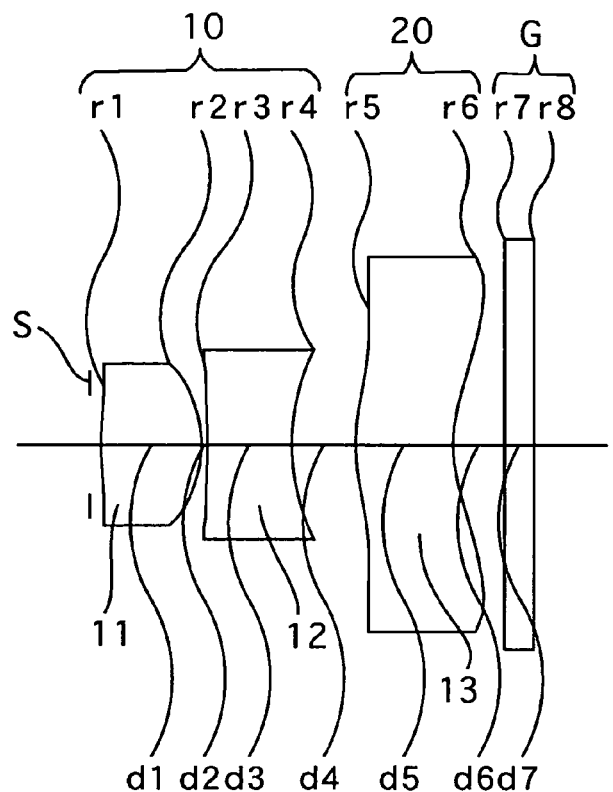
Fig. 14A
FNO=1:3.5
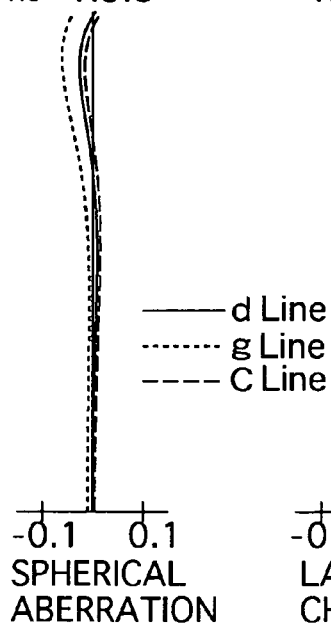
-0.1  0.1
SPHERICAL
ABERRATION
CHROMATIC
ABERRATION
——— d Line
········ g Line
- - - - C Line
Fig. 14B
W=31.3°
-0.01  0.01
LATERAL
CHROMATIC
ABERRATION
Fig. 14C
W=31.3°
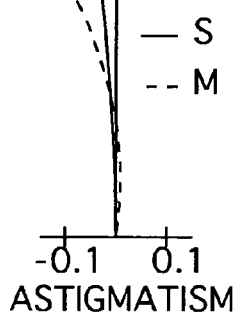
-0.1  0.1
ASTIGMATISM
——— S
- - M
Fig. 14D
W=31.3°
-2.0(%)2.0
DISTORTION Fig. 15
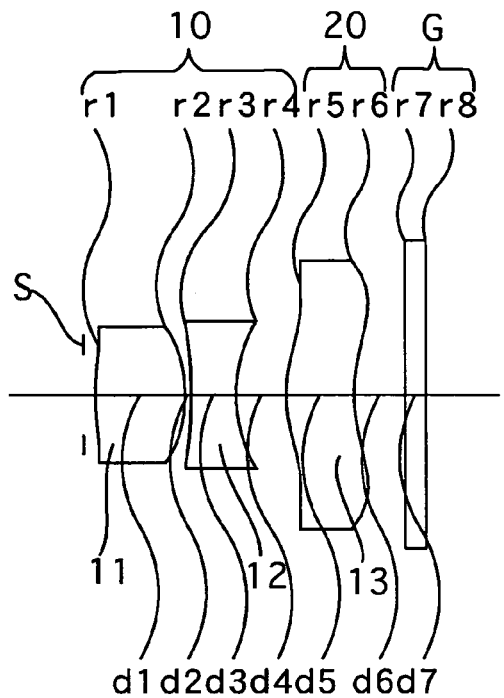
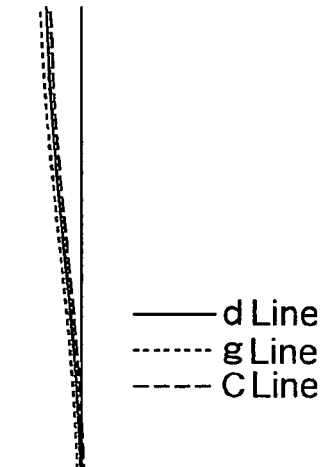
Fig.16A
FNO=1:3.2
—— d Line
······· g Line
---- C Line
-0.1  0.1
SPHERICAL
ABERRATION
CHROMATIC
ABERRATION
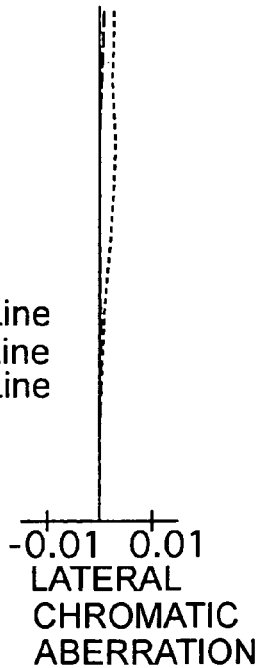
Fig.16B
W=31.8°
-0.01  0.01
LATERAL
CHROMATIC
ABERRATION
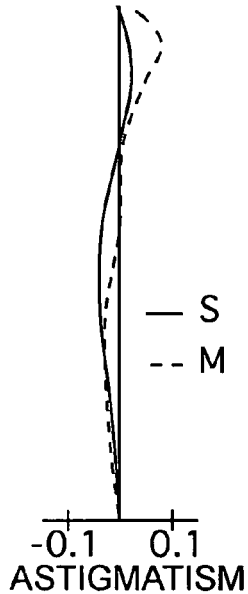
Fig.16C
W=31.8°
—— S
-- M
-0.1  0.1
ASTIGMATISM
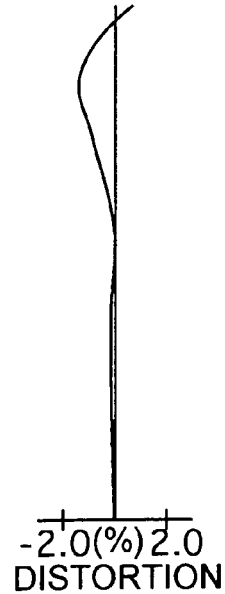
Fig.16D
W=31.8°
-2.0(%) 2.0
DISTORTION Fig. 17
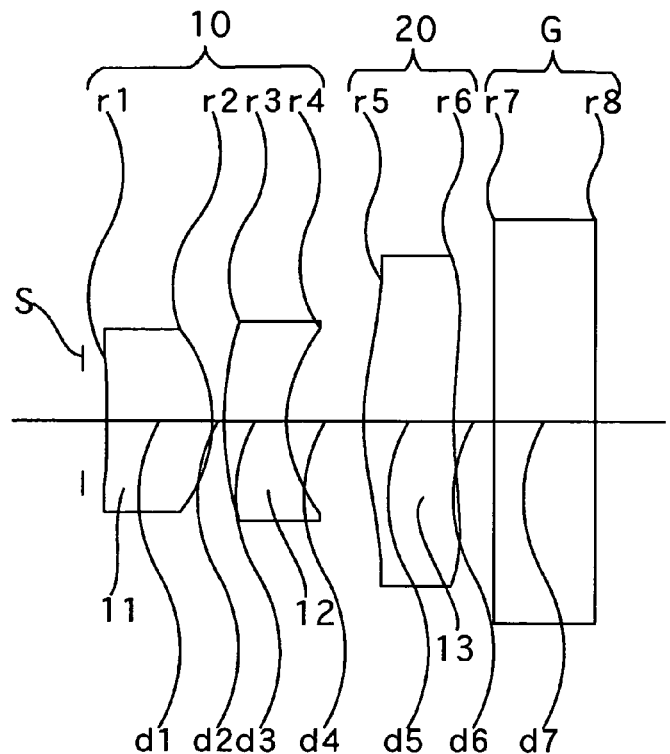
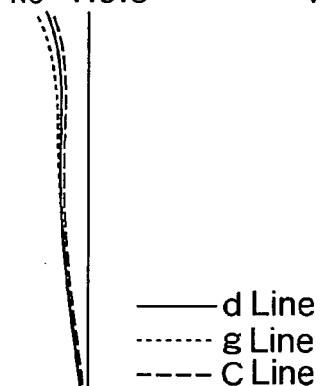
Fig. 18A
F$_{NO}$=1:3.5
—— d Line
······ g Line
- - - C Line
-0.1  0.1
SPHERICAL
ABERRATION
CHROMATIC
ABERRATION
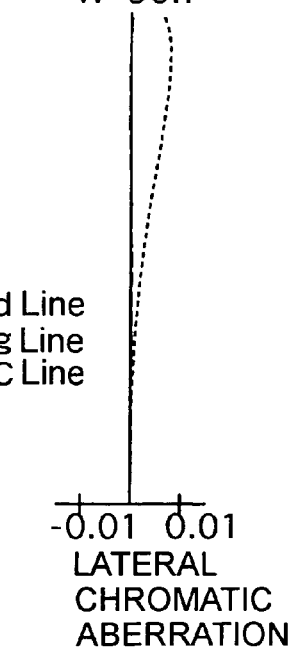
Fig. 18B
W=30.7°
-0.01  0.01
LATERAL
CHROMATIC
ABERRATION
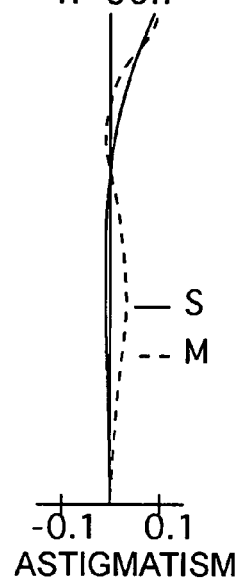
Fig. 18C
W=30.7°
—— S
- - M
-0.1  0.1
ASTIGMATISM
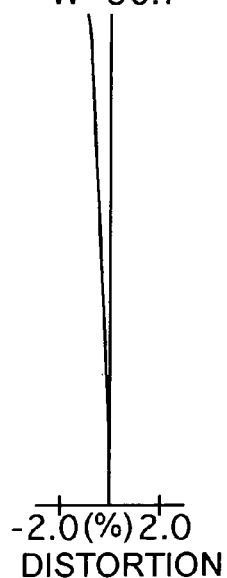
Fig. 18D
W=30.7°
-2.0(%) 2.0
DISTORTION Fig. 19
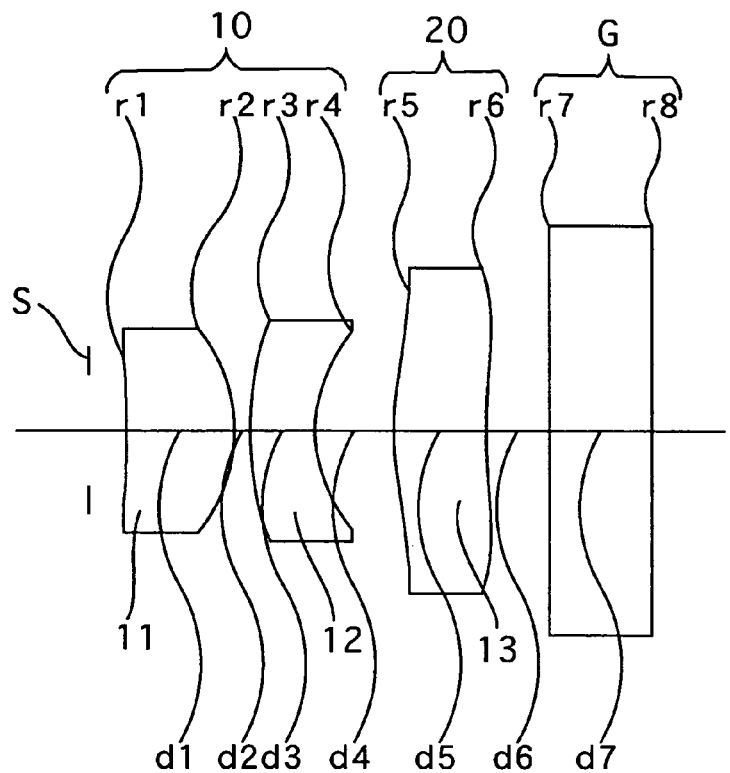
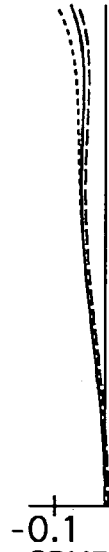
Fig.20A
FNO=1:3.5
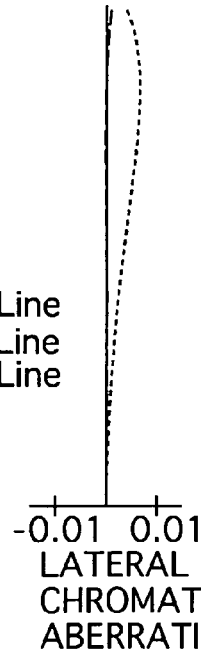
Fig.20B
W=28.4°
—— d Line
------- g Line
---- C Line
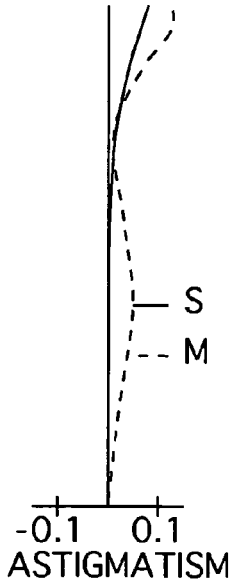
Fig.20C
W=28.4°
—— S
--- M
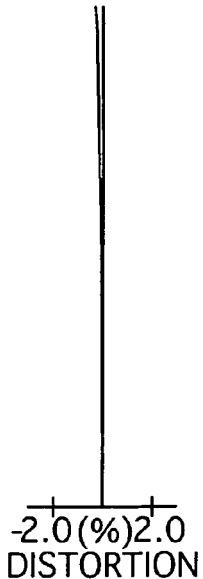
Fig.20D
W=28.4°
-0.1  0.1
SPHERICAL
ABERRATION
CHROMATIC
ABERRATION
-0.01  0.01
LATERAL
CHROMATIC
ABERRATION
-0.1  0.1
ASTIGMATISM
-2.0(%)2.0
DISTORTION

IMAGING OPTICAL SYSTEM

BACKGROUND OF THE INVENTION

1. Field of the Invention

The present invention relates to an imaging optical system which uses a solid-state image sensor, and particularly, relates to a compact high-quality imaging optical system having a fast aperture ratio of 1:2.8 through 3.5, and a half angle-of-view of 30° or more. The above-mentioned imaging optical system is suitable for a small and light-weight digital still camera and a video camera, and in particular, suitable for a mobile phone and a PDA (portable data handsets) in which the imaging optical system has to be accommodated into a very thin body.

2. Description of the Prior Art

In recent years, a conventional silver-halide film camera has been replaced with a digital still camera and a video camera, both of which are hereinafter referred to as a digital camera, utilizing a small solid state imaging sensor such as CCDs and CMOSs, etc. Such a digital camera has rapidly become popular.

Along with the development of a miniaturized solid state imaging sensor with higher density of pixels, a digital camera has had higher optical performance, such as higher resolution and a higher zoom ratio.

On the other hand, a mobile phone and a PDA, both of which are hereinafter referred to as a portable device, have introduced a portability-oriented design. Furthermore, the portable device provided with a photographic lens unit in order to function as a digital camera has rapidly become popular.

In a small digital camera, an attempt has been made to attain a thinner body thereof by mechanically retracting the photographic lens unit into the camera body when the digital camera is not used.

However, since the industrial standards for the portable devices with respect to falling and shock, etc., are strict, it is difficult to employ a mechanism to protrude a portion of the camera body (e.g., the photographic lens unit) from the main body thereof, and to employ a drive mechanism to mechanically drive the photographic lens unit, etc., when the digital camera is being used.

Accordingly, most of the portable devices have merely employed a smaller solid-state image sensor and a fixed-focal length optical system including only one or two lens elements.

Therefore it has been known that such a fixed-focal length optical system can at most obtain a low resolution image just for a user's temporal memorandum. In recent years, on the other hand, an optical system incorporated in the portable devices has been required to have a higher resolution equivalent to a digital camera.

In a solid state imaging sensor used in the above-mentioned digital camera, a micro-lens element and a color filter are provided in the close vicinity of the light-receiving surface (imaging surface) of pixels in order to increase aperture efficiency of the light-receiving portion of the solid state imaging sensor. However, the micro-lens element and the color filter are generally positioned slightly away from the imaging surface. Therefore if light rays emitted from the final lens element are obliquely incident on the imaging surface, the oblique light rays are interrupted by the filter, so that shading occurs. The shading causes a decrease of peripheral illumination and unevenness of color distribution due to misalignment between the color filter and the pixels.

In order to avoid the above drawbacks, the imaging optical system is required to have telecentricity, i.e., the light rays are made incident on the imaging plane in a direction substantially perpendicular thereto. In other words, the imaging optical system in which the exit pupil is positioned far away from the image plane has been required.

The solid-state image sensor requires a space for positioning at least the following optical elements:

(i) a protective glass plate for preventing scratches on the imaging surface, and dust thereon;

(ii) an optical low-pass filter for preventing moiré caused by the periodic structure of the solid-state image sensor; and (iii) an infrared-cut filter for lowering sensitivity of the infrared wavelength range so that sensitivity corresponding to the visible wavelength range can substantially be obtained.

Still further, a longer back focal distance (the distance from the final lens surface to the imaging surface) is required to prevent shading caused by dust sticking to a lens surface.

In order to attain higher resolution, it has been common to increase the number of pixels by miniaturizing each pixel while the dimensions of the imaging surface remains the same. Furthermore, in recent years, the pixel pitch has been gradually approaching the wavelength of visible light. One pixel pitch up to 2.5 µm has already been achieved, and further miniaturization of the pixel pitch has been getting close to its limit.

Accordingly, in order to increase the number of pixels, it has becomes essential to increase the dimensions of the imaging surface. Increasing the dimensions of the imaging surface is equivalent to making the focal length of the imaging optical system longer. However, it is known that aberrations become larger in proportion to the focal length. Therefore the imaging optical system has to cope with a lot of optical requirements.

Recently, optimization on the positions of the color filters and micro-lens elements which are used with CCDs or CMOSs and the like has become possible in accordance with a type of the imaging optical system, so that requirements for telecentricity of the imaging optical system are not so strict as they used to be.

Furthermore, the low-pass filter provided between the imaging optical system and the solid-state image sensor can be omitted due to further development of image processing technology through which a higher processing speed can be attained. Namely, the role of the low-pass filter can be replaced with the image processing technology itself.

Accordingly, along with technological advancements in the solid-state image sensor and other related technologies, a compact imaging optical system, having an appropriate telecentricity, the back focal distance to the minimum necessary, and higher resolution, has been more and more required.

As a compact imaging optical system having superior portability, a lens system of single-lens-element arrangement or two-lens-element arrangement has been known in the art. Furthermore, an aperture stop is provided on the object side of the above lens system.

However, it has been difficult for such imaging optical systems having a single or two lens-element arrangement to be considered as an imaging optical system which attains a higher picture quality and a higher resolution.

In order to solve the above drawbacks, an imaging optical system, including an aperture stop provided on the most object side thereof, and a three-lens-element arrangement (a positive refractive power (hereinafter, a positive lens element), a lens element having a negative refractive power (hereinafter, a negative lens element), and the other positive lens element) has been proposed in Japanese Unexamined Patent Publication (JUPP) No. Hei-5-188284 and JUPP No. 2001-75006. However, in such an imaging optical system in which the refractive power is distributed over the positive lens elements at the most object-side and the most image-side of the imaging optical system, the back focal distance can be secured relatively longer; however, in the case where the optical low-pass filter and the infrared-cut filter are omitted, the distance from the aperture stop to the imaging surface becomes undesirably too long.

Furthermore, since the refractive power of each lens element is designed to be stronger, when a resin material is used for forming the lens elements for the purpose of cost reduction, it should be understood that the lens elements made of a resin material are vulnerable to the changes in environmental conditions such as temperature and humidity.

In order to solve the above drawbacks experienced in JUPP No. Hei-5-188284 and JUPP No. 2001-75006, JUPP No. 2002-228922 and JUPP No. 2002-365529 have proposed an imaging optical system with the following features:

(i) a strong positive refractive power is given to an object-side lens element(s);

(ii) a relatively weaker refractive power is given to an image-side lens element(s); and (iii) the image-side lens element(s) is arranged to only function as an aberration-correcting lens element(s).

Due to the above arrangement, the distance from the aperture stop to the imaging surface can be made shorter; however, the imaging optical system is constituted by four lens elements. If an attempt is made to make the imaging optical system shorter, each lens element has to be made thinner, so that machining the lens element becomes difficult, and manufacturing costs thereof increase.

SUMMARY OF THE INVENTION

The present invention provides a compact high-quality imaging optical system which can be incorporated in digital cameras, and particularly, in the portable devices.

More specifically, the imaging optical system according to the present invention can attain the following:

a fast aperture ratio of 1:2.8 through 3.5;

a half angle-of-view of 30° or more;

imaging performance which can sufficiently copes with a solid-state image sensor with higher resolution;

a shorter length of the entire imaging optical system with a simple structure thereof; and lower manufacturing costs.

According to an aspect of the present invention, there is provided an imaging optical system including an aperture stop, a positive first lens group, and a positive or negative second lens group, in this order from the object.

The positive first lens group includes a positive first lens element and a negative second lens element, in this order from the object.

The positive first lens element of the positive first lens group is preferably provided with an aspherical surface on at least the object-side surface thereof. The aspherical surface is preferably formed so that the higher a height from the optical axis in a radial direction becomes the more an aspherical surface at the height is displaced toward the object, compared with a paraxial spherical surface. Due to this arrangement, spherical aberration and off-axis coma can be corrected in a well balanced manner.

The second lens group includes a meniscus third lens element. The meniscus third lens element is provided with an aspherical surface on each lens surface thereof, and has the convex surface facing toward the object in the vicinity of the optical axis.

The imaging optical system and the positive first lens element of the positive first lens group satisfy the following conditions:

$$0.6 < |f_1/f_2| < 1.0 \quad (1)$$

$$1.0 < f_{12}/f < 1.6 \quad (2)$$

$$0.301 \leq |R_2/f| < 0.7 \quad (3)$$

wherein f designates the focal length of the entire imaging optical system;

$f_1$ designates the focal length of the positive first lens element;

$f_2$ designates the focal length of the negative second lens element;

$f_{12}$ designates the focal length of the positive first lens group; and $R_2$ designates the radius of curvature of the image-side surface of the positive first lens element.

In the positive first lens group, the positive first lens element preferably includes a positive lens element having a convex surface facing toward the image, and the negative second lens element preferably includes a negative lens element having a concave surface facing toward the image.

The negative second lens element of the positive first lens group is preferably provided with an aspherical surface on at least the image-side surface thereof. The aspherical surface is preferably formed so that the higher a height from the optical axis in a radial direction becomes the more an aspherical surface at the height is displaced toward the object, compared with a paraxial spherical surface. Due to this arrangement, telecentricity and aberrations are well balanced.

The negative second lens element preferably satisfies the following conditions:

$$0.2 < R_4/f < 0.7 \quad (4)$$

$$0.15 < D/f < 0.4 \quad (5)$$

wherein $R_4$ designates the radius of curvature of the image-side surface of the negative second lens element; and D designates the distance between the positive first lens group and the second lens group.

The positive or negative meniscus third lens element constituting the second lens group preferably satisfies the following condition:

$$-0.1 < f_{12}/f_3 < 0.7 \quad (6)$$

wherein $f_{12}$ designates the focal length of the positive first lens group; and $f_3$ designates the focal length of the meniscus third lens element.

The positive or negative meniscus third lens element constituting the second lens group is arranged to have an aspherical surface on each lens surface thereof, and is formed so that the positive refractive power is weaker in the vicinity of the paraxial region, and is stronger in the peripheral region of the meniscus third lens element. Accordingly, it is preferable for the meniscus third lens element to be made of a resin material which can be easily formed into a desired lens shape. Furthermore, the aspherical surfaces on both lens surfaces are preferably formed as follows:

On the object-side aspherical surface, the higher a height from the optical axis in a radial direction becomes the weaker the positive refractive power is, compared with a paraxial spherical surface.

On the image-side aspherical surface, the higher a height from the optical axis in a radial direction becomes the weaker the negative refractive power is, compared with a paraxial spherical surface; and the peripheral area of the image-side surface of the meniscus third lens element is arranged to generate a positive refractive power instead of the negative refractive power.

The meniscus third lens element of the second lens group preferably satisfies the following condition:

$$0.4 < R_5/f < 1.0 \quad (7)$$

wherein $R_5$ designates the radius of curvature of the paraxial spherical surface on the object-side surface of the meniscus third lens element; and f designates the focal length of the entire imaging optical system.

The present disclosure relates to subject matter contained in Japanese Patent Application No. 2004-145464 (filed on May 14, 2004) which is expressly incorporated herein in its entirety.

BRIEF DESCRIPTION OF THE DRAWINGS

The present invention will be discussed below in detail with reference to the accompanying drawings, in which:

FIG. 9 is a lens arrangement of the imaging optical system, according to a fifth embodiment of the present invention;

FIGS. 10A, 10B, 10C and 10D show aberrations occurred in the lens arrangement of FIG. 9, when an object at infinity is in an in-focus state;

FIG. 11 is a lens arrangement of the imaging optical system, according to a sixth embodiment of the present invention;

FIGS. 12A, 12B, 12C and 12D show aberrations occurred in the lens arrangement of FIG. 11, when an object at infinity is in an in-focus state;

FIG. 13 is a lens arrangement of the imaging optical system, according to a seventh embodiment of the present invention;

FIGS. 14A, 14B, 14C and 14D show aberrations occurred in the lens arrangement of FIG. 13, when an object at infinity is in an in-focus state;

FIG. 15 is a lens arrangement of the imaging optical system, according to an eighth embodiment of the present invention;

FIGS. 16A, 16B, 16C and 16D show aberrations occurred in the lens arrangement of FIG. 15, when an object at infinity is in an in-focus state;

FIG. 17 is a lens arrangement of the imaging optical system, according to a ninth embodiment of the present invention;

FIGS. 18A, 18B, 18C and 18D show aberrations occurred in the lens arrangement of FIG. 17, when an object at infinity is in an in-focus state;

FIG. 19 is a lens arrangement of the imaging optical system, according to a tenth embodiment of the present invention; and FIGS. 20A, 20B, 20C and 20D show aberrations occurred in the lens arrangement of FIG. 19, when an object at infinity is in an in-focus state.

DESCRIPTION OF THE PREFERRED EMBODIMENTS

Figure 1:
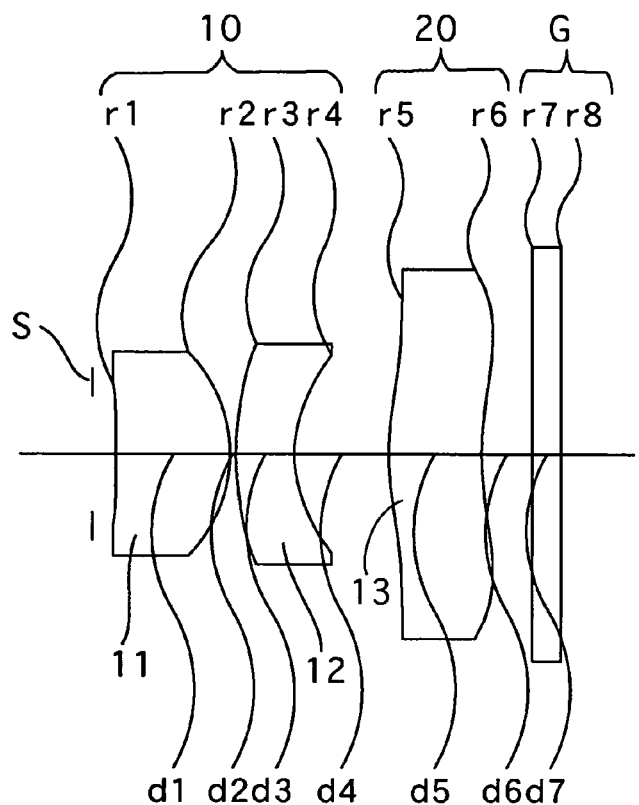
FIG. 1 is a lens arrangement of the imaging optical system, according to a first embodiment of the present invention.
Figure 2A:
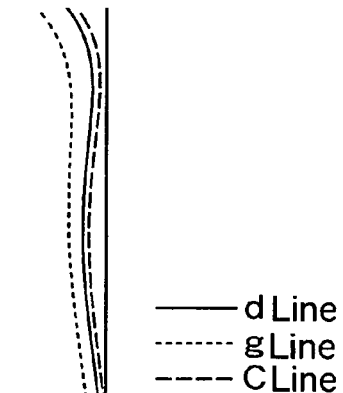
FIGS. 2A, 2B, 2C and 2D show aberrations occurred in the lens arrangement of FIG. 1, when an object at infinity is in an in-focus state.
Figure 2B:
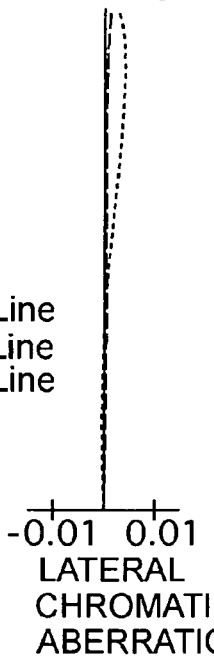
Figure 2C:
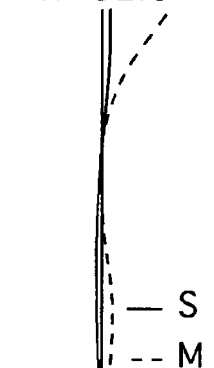
Figure 2D:
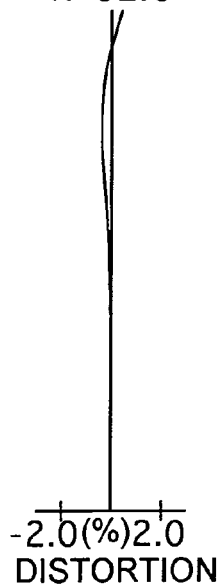

The imaging optical system of the present invention, as shown in FIGS. 1, 3, 5, 7, 9, 11, 13, 15, 17 and 19 of the first through tenth embodiments, includes an aperture stop S, a positive first lens group 10, and a positive or negative second lens group 20, in this order from the object. Note that in the first to tenth embodiment, the imaging optical system is applied to a digital camera.

The positive first lens group 10 includes a positive first lens element 11, and a negative second lens element 12, in this order from the object.

The second lens group 20 includes a meniscus third lens element 13. The meniscus third lens element 13 is provided with an aspherical surface on each lens surface thereof, and has the convex surface facing toward the object in the vicinity of the optical axis.

Accordingly, the imaging optical system of the present invention is the three-lens-element arrangement, i.e., the positive first lens element 11, the negative second lens element 12 and the meniscus third lens element 13, in this order from the object.

In the lens arrangement of each embodiment, a symbol G designates a filter group, which is shown as a plane-parallel plate, including a low-pass filter, an infrared-cut filter, and a CCD cover glass.

In the imaging optical system of the present invention, majority of the refractive power is distributed over the positive first lens element 11 and the negative second lens element 12 (i.e., the first lens group 10), and the meniscus third lens element 13 (i.e., the second lens group 20) having the aspherical surfaces on both lens surfaces thereof is arranged to have a relatively weak refractive power, and to correct off-axis aberrations such as field curvature and distortion, etc. The meniscus third lens element 13 can be formed as either positive or negative lens element.

Condition (1) specifies the ratio of the refractive power (focal length) of the positive first lens element 11 to that of the second lens element 12.

By suitably distributing the refractive power over the positive first lens element 11 and the negative second lens element 12 in the positive first lens group 10 so that condition (1) is satisfied, spherical aberration and coma can be corrected, and at the same time, miniaturization of the imaging optical system can be attained.

Furthermore, by suitably distributing the refractive power over the positive first lens element 11 and the negative second lens element 12 within the range of condition (1), lateral chromatic aberration and axils chromatic aberration can also be corrected in a well balanced manner.

If $|f_1/f_2|$ exceeds the lower limit of condition (1), the positive refractive power of the positive first lens element 11 becomes too strong. Consequently, spherical aberration largely occurs at the first lens element 11, so that the correcting thereof by the negative second lens element 12 and thereafter becomes difficult.

If $|f_1/f_2|$ exceeds the upper limit of condition (1), the negative refractive power of the negative second lens element 12 becomes too strong. Consequently, off-axis coma largely occurs, and it becomes difficult to suitably correct field curvature.

Condition (2) specifies the ratio of the refractive power of the positive first lens group 10 to that of the entire imaging optical system. By satisfying this condition, miniaturization of the lens groups and adequate telecentricity can be achieved.

If $f_{12}/f$ exceeds the lower limit of condition (2), the refractive power of the positive first lens group 10 becomes too strong. As a result, it is advantageous to attain miniaturization of the imaging optical system, and to attain a wider angle-of-view (shorter focal length) at the short focal length extremity. However, the sufficient back focal distance cannot be secured, and telecentricity deteriorates.

If $f_{12}/f$ exceeds the upper limit of condition (2), the refractive power of the positive first lens group 10 becomes too weak, and the position of the exit pupil becomes distant from the imaging surface accordingly. As a result, it is advantageous to attain adequate telecentricity. On the other hand, if an attempt is made to attain a wider angle-of-view (shorter focal length) at the short focal length extremity, a stronger positive refractive power has to be given to the second lens group 20; however, providing a stronger positive refractive power is undesirable from the viewpoint of the correcting of aberrations.

In the positive first lens group 10, the positive first lens element 11 can be constituted by a positive lens element having a convex surface facing toward the image, and the negative second lens element 12 can be constituted by a negative lens element having a concave surface facing toward the image.

The positive first lens element 11 of the positive first lens group 10 is preferably provided with an aspherical surface on at least the object-side surface thereof. The aspherical surface is preferably formed so that the higher a height from the optical axis in a radial direction becomes the more an aspherical surface at the height is displaced toward the object, compared with a paraxial spherical surface. In addition, the positive first lens element 11 preferably satisfies condition (3).

The positive first lens element 11 has a stronger positive refractive power, which is a cause of spherical aberration and off-axis coma. By forming the aspherical surface on the object-side surface of the positive first lens element 11, the correcting of spherical aberration and off-axis coma occurred at the positive first lens element 11 can be effectively made.

If the radius of curvature of the image-side surface of the positive first lens element 11 becomes too small to the extent that $|R_2/f|$ exceeds the lower limit of condition (3), the correcting of spherical aberration becomes difficult. Moreover, the amount of asphericity of the object-side aspherical surface of the positive first lens element 11, which is formed to correct aberrations occurred at the image-side surface thereof, becomes too large, so that it becomes difficult to correct coma and field curvature.

If $|R_2/f|$ exceeds the upper limit of condition (3), the radius of curvature of the image-side surface of the positive first lens element 11 becomes too large. Consequently, the radius of curvature of the object-side surface of the positive first lens element 11 inevitably becomes smaller in order to secure a positive refractive power. Consequently, a wider angle-of-view (shorter focal length) cannot be attained at the short focal length extremity.

Furthermore, in the negative second lens element 12, by providing an aspherical surface, an aspherical surface can be formed on at least the image-side surface thereof, and the aspherical surface is formed so that the higher a height from the optical axis in a radial direction becomes the more an aspherical surface at the height is displaced toward the object, compared with a paraxial spherical surface. Due to this arrangement and by maintaining an appropriate distance between the positive first lens group 10 and the second lens group 20, telecentricity and aberrations can be well balanced.

Still further, the image-side surface of the negative second lens element 12 is preferably formed as a strong diverging surface satisfying condition (4); and it is preferable that the distance between the positive first lens group 10 and the second lens group 20 satisfy condition (5).

Namely, by providing the strong diverging surface on the image-side surface of the negative second lens element 12 according to condition (4), light rays to be emitted from the second lens group 20 can effectively be made away from the optical axis, and by refracting the light rays through the second lens group 20 which is being positioned at an adequate position within the range of condition (5), appropriate telecentricity can be achieved, and at the same time, the correcting of off-axis aberrations can suitably be made.

If $R_4/f$ exceeds the lower limit of condition (4), the diverging refractive power of the image-side surface of the negative second lens element 12 becomes too strong. Consequently, it becomes difficult to maintain coma flare minimum. At the same time, the positive refractive power at the periphery of the negative second lens element 12 becomes too strong, so that the correcting of coma to minimum becomes difficult.

If the radius of curvature of the image-side surface of the negative second lens element 12 becomes larger to the extent that $R_4/f$ exceeds the upper limit of condition (4), i.e., the diverging refractive power therefrom becomes weaker, the distance between the positive first lens group 10 and the second lens group 20 has to be made longer to attain suitable telecentricity, which is undesirable from the viewpoint of further miniaturization of the imaging optical system.

If the distance between the positive first lens group 10 and the second lens group 20 becomes too short to the extent that D/f exceeds the lower limit of condition (5), it is advantageous for further miniaturization of the imaging optical system. However, in order to converge the diverging light rays emitted from the negative second lens element 12 by the meniscus third lens element 13 (the second lens group 20), it is necessary to make the positive refractive power at the periphery of the meniscus third lens element 13 stronger. Consequently, the amount of asphericity of the meniscus third lens element 13 has to be undesirably increased.

If the distance between the positive first lens group 10 and the second lens group 20 becomes too long to the extent that D/f exceeds the upper limit of condition (5), it is undesirable from the viewpoint of further miniaturization of the imaging optical system, and it becomes difficult to achieve a wider angle-of-view (shorter focal length) at the short focal length extremity.

Furthermore, the meniscus third lens element 13, constituting the second lens group 20, is arranged to have a relatively weaker refractive power, since majority of the refractive power is distributed on the positive first lens group 10. Therefore the meniscus third lens element 13 can be made from a resin material, and manufacturing costs thereof can be reduced.

The meniscus third lens element 13 is provided to mainly correct off-axis aberrations such as filed curvature and distortion.

Still further, the meniscus third lens element 13 is formed in a meniscus lens shape with the convex surface facing toward the object in the close vicinity of the optical axis. Due to this arrangement, the meniscus third lens element 13 can be designed not to have too strong refractive power, and can maintain spherical aberration corrected by the positive first lens group 10 so that the corrected spherical aberration does not further deteriorate.

The aspherical surfaces formed on both the lens surfaces of the meniscus third lens element 13 are preferably formed so that the higher a height from the optical axis in a radial direction becomes the more an aspherical surface at the height is displaced toward the object, compared with a paraxial spherical surface.

More specifically, the aspherical surfaces of the meniscus third lens element 13 are preferably formed as follows:

On the object-side aspherical surface, the higher a height from the optical axis in a radial direction becomes the weaker the positive refractive power is, compared with a paraxial spherical surface.

On the image-side aspherical surface, the higher a height from the optical axis in a radial direction becomes the weaker the negative refractive power is, compared with a paraxial spherical surface; and the peripheral area of image-side surface of the meniscus third lens element is arranged to generate a positive refractive power instead of the negative refractive power.

Due to the object-side aspherical surface, the positive refractive power can be made weaker at the periphery of the object-side surface of the meniscus third lens element 13, so that excessive refraction can be prevented thereat. Consequently, the meniscus third lens element 13 can maintain coma and field curvature which have suitably been corrected by the positive first lens group 10 so that the corrected coma and field curvature do not further deteriorate.

Due to the image-side aspherical surface, light rays at the periphery of the image-side of the meniscus third lens element 13 can adequately be refracted, so that distortion and telecentricity can suitably be maintained.

Condition (6) specifies the refractive power of the meniscus third lens element 13 constituting the second lens group 20.

If the negative refractive power of the meniscus third lens element 13 becomes too strong to the extent that $f_{12}/f_3$ exceeds the lower limit of condition (6), the amount of asphericity at the periphery of the meniscus third lens element 13 becomes too large in order to suitably correct distortion and telecentricity. Consequently, it becomes difficult to suitably correct aberrations on the entire imaging surface.

If the positive refractive power of the meniscus third lens element 13 becomes strong to the extent that $f_{12}/f_3$ exceeds the upper limit of condition (6), focus shift due to environmental changes such as temperature change undesirably occurs by a large amount.

Condition (7) specifies the degree of divergence the object-side surface of the meniscus third-lens element 13.

If the radius of curvature of the object-side paraxial spherical surface on the object side of the meniscus third lens element 13 becomes smaller to the extent that $R_5/f$ exceeds the lower limit of condition (7), it becomes difficult to make field curvature smaller, while spherical aberration is suitably maintained. Moreover, the peripheral portion of the formed image bents largely toward the image plane, so that it becomes difficult to secure the back focal distance.

If the radius of curvature of the object-side paraxial spherical surface on the object side of the meniscus third lens element 13 becomes larger to the extent that $R_5/f$ exceeds the upper limit of condition (7), the amount of asphericity on the image-side surface of the meniscus third lens element 13 has to be made larger to maintain appropriate telecentricity. Consequently, off-axis coma deteriorates.

Specific numerical data of the embodiments will be described hereinafter.

In the diagrams of chromatic aberration (axial chromatic aberration) represented by spherical aberration, the solid line and the two types of dotted lines respectively indicate spherical aberrations with respect to the d, g and c lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, FNO. designates the f-number, f designates the focal length of the imaging optical system, W designates the half angle-of-view (°), fB designates the back focal distance (the equivalent air thickness from the image-side surface of the meniscus third lens element 13 to the image plane (imaging surface)), r designates the radius of curvature, d designates the lens-element thickness or distance between lens elements, Nd designates the refractive index of the d-line, and v designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

FIG. 1 is the lens arrangement of the imaging optical system, according to the first embodiment of the present invention. FIGS. 2A through 2D show aberrations occurred in the lens arrangement of FIG. 1, when an object at infinity is in an in-focus state. Table 1 shows the numerical data of the first embodiment.

The imaging optical system of the present invention includes an aperture stop S, a positive first lens group 10, and a positive or negative second lens group 20, in this order from the object.

The positive first lens group 10 includes a positive first lens element 11, and a negative second lens element 12, in this order from the object.

The positive first lens element 11 is constituted by a positive biconvex lens element. In the biconvex lens element (the positive first lens element 11), the object-side surface thereof is provided with an aspherical surface which is formed so that the higher a height from the optical axis in a radial direction becomes the more an aspherical surface at the height is displaced toward the object, compared with a paraxial spherical surface; and the image-side surface thereof is formed as a spherical surface.

The negative second lens element 12 is constituted by a negative meniscus lens element having the convex surface facing toward the object. In the negative meniscus lens element (the negative second lens element 12), the object-side surface thereof is formed as an aspherical surface; and the image-side surface thereof is provided with an aspherical surface which is formed so that the higher a height from the optical axis in a radial direction becomes the more an aspherical surface at the height is displaced toward the object, compared with a paraxial spherical surface.

The second lens group 20 is constituted by the meniscus third lens element 13 which (i) is formed to have the convex surface facing toward the object in the close vicinity of the optical axis, (ii) is arranged to have a positive refractive power, and (iii) is arranged to have an aspherical surface on both surfaces thereof.

TABLE 1

FNo = 1:2.8
f = 5.72
W = 32.6°
fB = 1.50

| Surf. No. | r | d | Nd | ν |
|---|---|---|---|---|
| Aperture Stop | ∞ | 0.40 | | |
| 1* | 88.984 | 1.94 | 1.69055 | 54.5 |
| 2 | −2.565 | 0.10 | | |
| 3* | 4.682 | 1.00 | 1.83291 | 24.1 |
| 4* | 2.001 | 1.66 | | |
| 5* | 4.684 | 1.62 | 1.52538 | 56.3 |
| 6* | 5.498 | 0.87 | | |
| 7 | ∞ | 0.50 | 1.51633 | 64.1 |
| 8 | ∞ | — | | |

The symbol * designates the aspherical surface which is rotationally symmetrical with respect to the optical axis.
Aspherical surface data (the aspherical surface coefficients not indicated are zero (0.00)):

| Surf. | K | A4 | A6 |
|---|---|---|---|
| 1 | 0.0 | $-0.10753 \times 10^{-1}$ | $-0.14208 \times 10^{-1}$ |
| 3 | 0.0 | $-0.23069 \times 10^{-1}$ | $0.93498 \times 10^{-2}$ |
| 4 | 0.0 | $-0.55171 \times 10^{-1}$ | $0.15888 \times 10^{-1}$ |
| 5 | 0.0 | $-0.18316 \times 10^{-1}$ | $0.91604 \times 10^{-3}$ |
| 6 | 0.0 | $-0.12124 \times 10^{-1}$ | $0.13293 \times 10^{-3}$ |

| Surf. | A8 | A10 |
|---|---|---|
| 1 | $0.38102 \times 10^{-2}$ | — |
| 3 | $-0.17940 \times 10^{-2}$ | $0.16579 \times 10^{-3}$ |
| 4 | $-0.38730 \times 10^{-2}$ | $0.16757 \times 10^{-3}$ |

Embodiment 2

Figure 3:
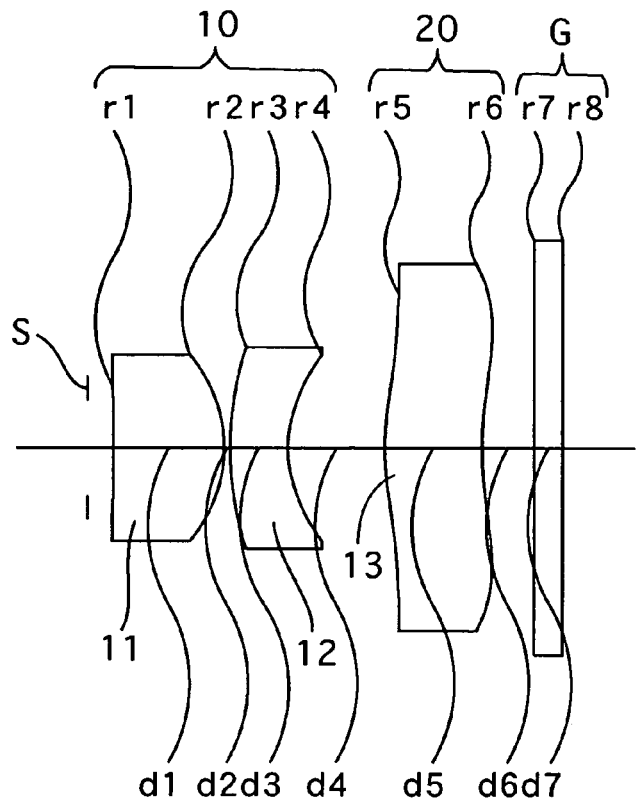
FIG. 3 is a lens arrangement of the imaging optical system, according to a second embodiment of the present invention.
Figure 4A:
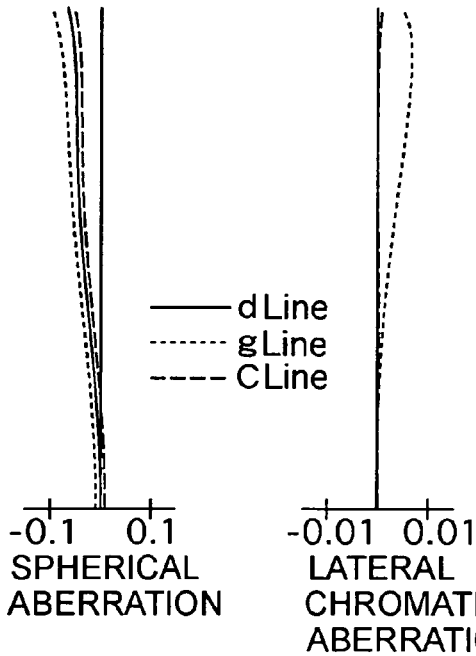
FIGS. 4A, 4B, 4C and 4D show aberrations occurred in the lens arrangement of FIG. 3, when an object at infinity is in an in-focus state.
Figure 4B:
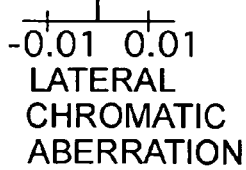
Figure 4C:
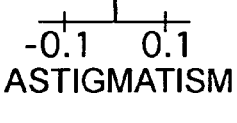
Figure 4D:
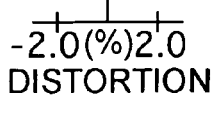

FIG. 3 is the lens arrangement of the imaging optical system, according to the second embodiment of the present invention. FIGS. 4A through 4D show aberrations occurred in the lens arrangement of FIG. 3, when an object at infinity is in an in-focus state. Table 2 shows the numerical data of the second embodiment. The lens arrangement and the positions of the aspherical surfaces are the same as those of the first embodiment.

TABLE 2

FNo = 1:3.5
f = 5.81
W = 32.2°
fB = 1.53

| Surf. No. | r | d | Nd | ν |
|---|---|---|---|---|
| Aperture Stop | ∞ | 0.45 | | |
| 1* | 76.430 | 1.91 | 1.69100 | 56.3 |
| 2 | −2.535 | 0.10 | | |
| 3* | 4.757 | 0.99 | 1.83291 | 24.1 |
| 4* | 1.983 | 1.68 | | |
| 5* | 4.834 | 1.67 | 1.52538 | 56.3 |
| 6* | 5.685 | 0.90 | | |
| 7 | ∞ | 0.50 | 1.51633 | 64.1 |
| 8 | ∞ | — | | |

The symbol * designates the aspherical surface which is rotationally symmetrical with respect to the optical axis.
Aspherical surface data (the aspherical surface coefficients not indicated are zero (0.00)):

| Surf. | K | A4 | A6 |
|---|---|---|---|
| 1 | 0.0 | $-0.12658 \times 10^{-1}$ | $-0.13514 \times 10^{-1}$ |
| 3 | 0.0 | $-0.22547 \times 10^{-1}$ | $0.93262 \times 10^{-2}$ |
| 4 | 0.0 | $-0.54895 \times 10^{-1}$ | $0.15822 \times 10^{-1}$ |
| 5 | 0.0 | $-0.17934 \times 10^{-1}$ | $0.98423 \times 10^{-3}$ |
| 6 | 0.0 | $-0.12279 \times 10^{-1}$ | $0.19311 \times 10^{-3}$ |

| Surf. | A8 | A10 |
|---|---|---|
| 1 | $0.41347 \times 10^{-2}$ | — |
| 3 | $-0.17811 \times 10^{-2}$ | $0.16529 \times 10^{-3}$ |
| 4 | $-0.39532 \times 10^{-2}$ | $0.18525 \times 10^{-3}$ |

Embodiment 3

Figure 5:
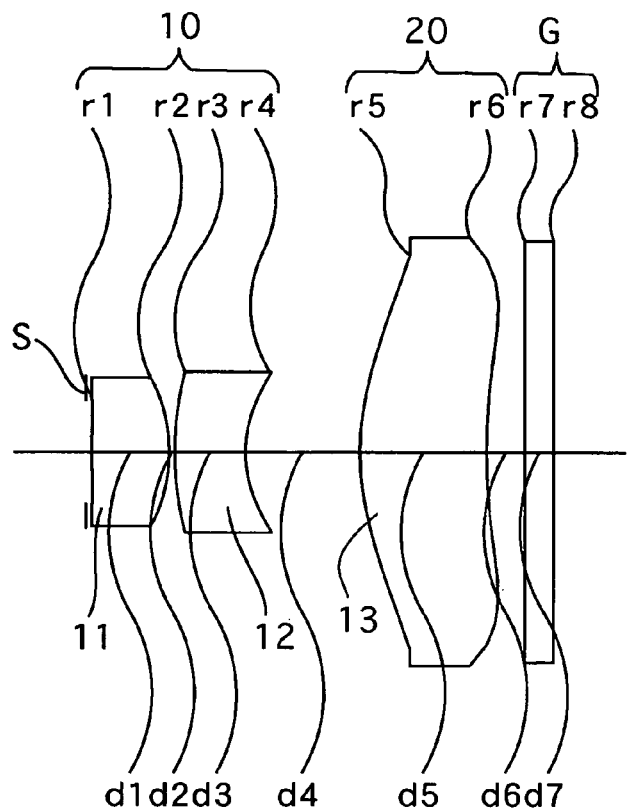
FIG. 5 is a lens arrangement of the imaging optical system, according to a third embodiment of the present invention.
Figure 6A:
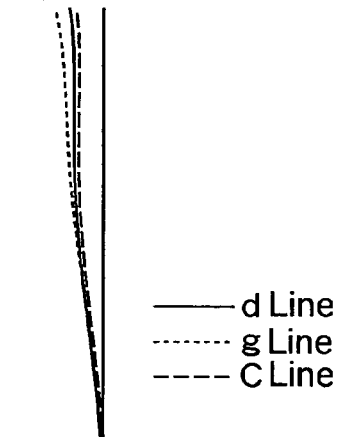
FIGS. 6A, 6B, 6C and 6D show aberrations occurred in the lens arrangement of FIG. 5, when an object at infinity is in an in-focus state.
Figure 6B:
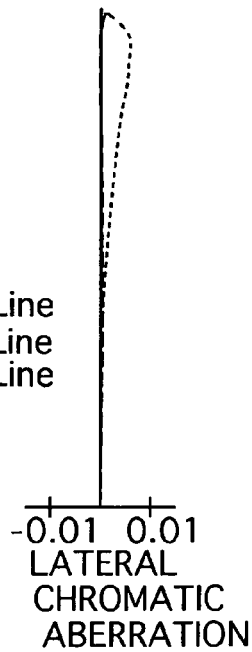
Figure 6C:
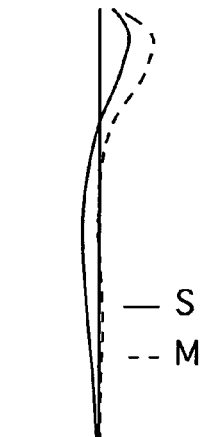
Figure 6D:
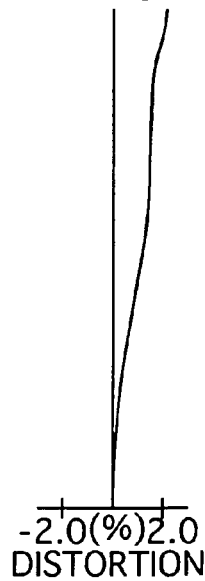

FIG. 5 is the lens arrangement of the imaging optical system, according to the third embodiment of the present invention. FIGS. 6A through 6D show aberrations occurred in the lens arrangement of FIG. 5, when an object at infinity is in an in-focus state. Table 3 shows the numerical data of the third embodiment.

The lens arrangement of the third embodiment is the same as the first embodiment except for the following:

The image-side surface (surface No. 2) of the positive first lens element 11 is made aspherical; and The object-side surface (surface No. 3) of the negative second lens element 12 is made spherical.

TABLE 3

FNo = 1:3.5
f = 6.30
W = 29.7°
fB = 1.30

| Surf. No. | r | d | Nd | ν |
|---|---|---|---|---|
| Aperture Stop | ∞ | 0.10 | | |
| 1* | 23.433 | 1.33 | 1.69100 | 56.3 |
| 2* | −2.974 | 0.10 | | |

TABLE 3-continued

| | | | | |
|---|---|---|---|---|
| 3 | 5.660 | 1.23 | 1.83291 | 24.1 |
| 4* | 2.056 | 1.99 | | |
| 5* | 4.664 | 2.17 | 1.52538 | 56.3 |
| 6* | 10.163 | 0.67 | | |
| 7 | ∞ | 0.50 | 1.51633 | 64.1 |
| 8 | ∞ | — | | |

The symbol * designates the aspherical surface which is rotationally symmetrical with respect to the optical axis.

Aspherical surface data (the aspherical surface coefficients not indicated are zero (0.00)):

| Surf. | K | A4 | A6 |
|---|---|---|---|
| 1 | 0.0 | $-0.17716 \times 10^{-1}$ | $-0.62865 \times 10^{-2}$ |
| 2 | 0.0 | $0.50528 \times 10^{-3}$ | $-0.37597 \times 10^{-2}$ |
| 4 | 0.0 | $-0.25028 \times 10^{-1}$ | $0.28395 \times 10^{-2}$ |
| 5 | 0.0 | $-0.60209 \times 10^{-2}$ | $0.23560 \times 10^{-3}$ |
| 6 | 0.0 | $0.13621 \times 10^{-3}$ | $-0.51099 \times 10^{-3}$ |

| Surf. | A8 | A10 |
|---|---|---|
| 1 | $0.38626 \times 10^{-3}$ | — |
| 4 | $-0.82932 \times 10^{-3}$ | $-0.14358 \times 10^{-3}$ |
| 5 | $-0.10452 \times 10^{-4}$ | — |
| 6 | $0.10000 \times 10^{-4}$ | — |

Embodiment 4

Figure 7:
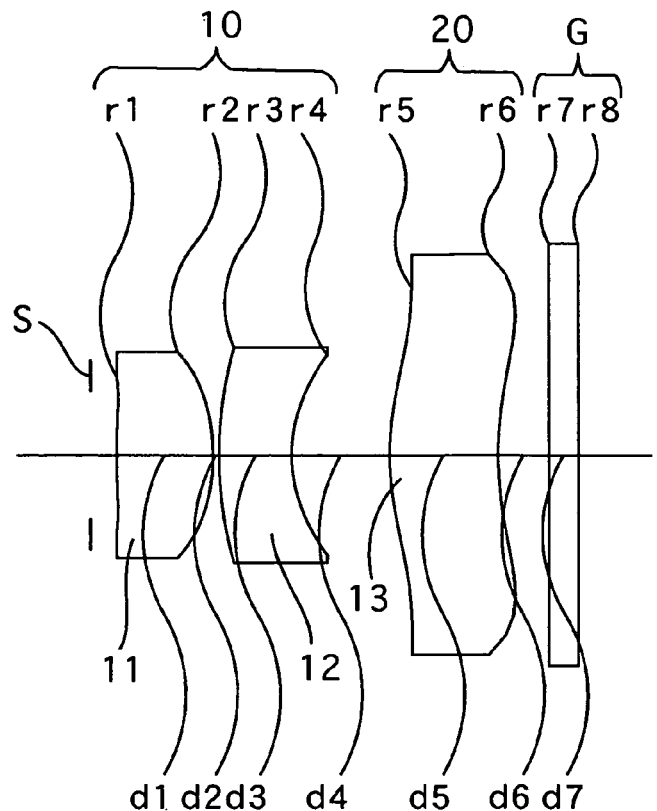
FIG. 7 is a lens arrangement of the imaging optical system, according to a fourth embodiment of the present invention.
Figure 8A:
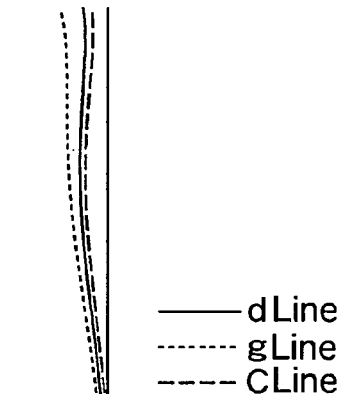
FIGS. 8A, 8B, 8C and 8D show aberrations occurred in the lens arrangement of FIG. 7, when an object at infinity is in an in-focus state.
Figure 8B:
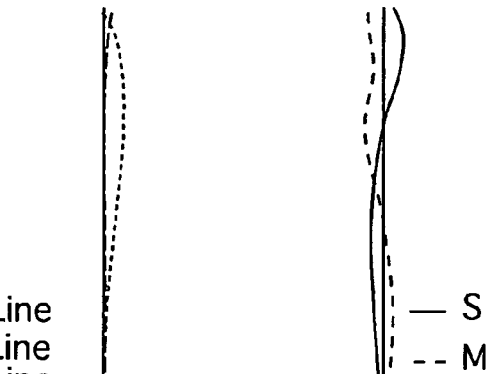
Figure 8C:
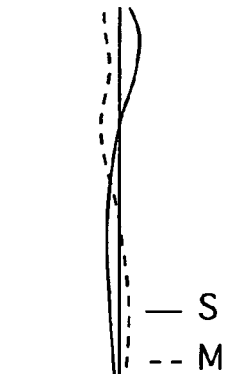
Figure 8D:
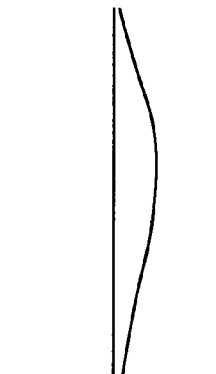

FIG. 7 is the lens arrangement of the imaging optical system, according to the fourth embodiment of the present invention. FIGS. 8A through 8D show aberrations occurred in the lens arrangement of FIG. 7, when an object at infinity is in an in-focus state. Table 4 shows the numerical data of the fourth embodiment. The lens arrangement and the positions of the aspherical surfaces are the same as those of the third embodiment.

TABLE 4

FNo = 1:2.8
f = 6.20
W = 30.6°
fB = 1.50

| Surf. No. | r | d | Nd | ν |
|---|---|---|---|---|
| Aperture Stop | ∞ | 0.45 | | |
| 1* | 13.383 | 1.65 | 1.69100 | 56.3 |
| 2* | -3.372 | 0.10 | | |
| 3 | 6.899 | 1.23 | 1.83291 | 24.1 |
| 4* | 2.494 | 1.68 | | |
| 5* | 4.568 | 1.87 | 1.52538 | 56.3 |
| 6* | 5.795 | 0.87 | | |
| 7 | ∞ | 0.50 | 1.51633 | 64.1 |
| 8 | ∞ | — | | |

The symbol * designates the aspherical surface which is rotationally symmetrical with respect to the optical axis.

Aspherical surface data (the aspherical surface coefficients not indicated are zero (0.00)):

| Surf. | K | A4 | A6 |
|---|---|---|---|
| 1 | 0.0 | $-0.12353 \times 10^{-1}$ | $-0.35218 \times 10^{-2}$ |
| 2 | 0.0 | $-0.65839 \times 10^{-3}$ | $-0.28308 \times 10^{-2}$ |
| 4 | 0.0 | $-0.12992 \times 10^{-1}$ | $0.23487 \times 10^{-2}$ |

TABLE 4-continued

| 5 | 0.0 | $-0.11017 \times 10^{-1}$ | $0.18597 \times 10^{-3}$ |
| 6 | 0.0 | $-0.44908 \times 10^{-2}$ | $-0.39106 \times 10^{-3}$ |

| Surf. | A8 | A10 |
|---|---|---|
| 1 | $-0.59219 \times 10^{-3}$ | — |
| 4 | $-0.51871 \times 10^{-5}$ | $-0.12526 \times 10^{-3}$ |
| 5 | $0.38412 \times 10^{-5}$ | — |

Embodiment 5

FIG. 9 is the lens arrangement of the imaging optical system, according to the fifth embodiment of the present invention. FIGS. 10A through 10D show aberrations occurred in the lens arrangement of FIG. 9, when an object at infinity is in an in-focus state. Table 5 shows the numerical data of the fifth embodiment.

In the positive first lens group 10 and the second lens group 20, all the lens surfaces thereof are made aspherical.

In the positive first lens group 10, both the positive lens element 11 and the negative lens element 12 are made from a resin material. As disclosed in this embodiment, it is possible to form the positive first lens element 11 and the negative second lens element 12 from a resin material; however, the negative second lens element 12 is formed as a biconcave lens element, since the refractive index of the negative second lens element 12 is made smaller.

The second lens group 20 is constituted by the meniscus third lens element 13 which is formed in a meniscus lens shape with the convex surface facing toward the object in the close vicinity of the optical axis, is arranged to have a weaker negative refractive power. Furthermore, the meniscus third lens element 13 is made of the same resin material used in forming the positive first lens element 11.

TABLE 5

FNo = 1:3.5
f = 6.00
W = 31.2°
fB = 1.52

| Surf. No. | r | d | Nd | ν |
|---|---|---|---|---|
| Aperture Stop | ∞ | 0.20 | | |
| 1* | 10.246 | 1.72 | 1.50915 | 56.4 |
| 2* | -1.935 | 0.10 | | |
| 3* | -50.793 | 1.46 | 1.58547 | 29.9 |
| 4* | 2.624 | 1.32 | | |
| 5* | 3.343 | 1.47 | 1.50915 | 56.4 |
| 6* | 2.799 | 0.89 | | |
| 7 | ∞ | 0.50 | 1.51633 | 64.1 |
| 8 | ∞ | — | | |

The symbol * designates the aspherical surface which is rotationally symmetrical with respect to the optical axis.

Aspherical surface data (the aspherical surface coefficients not indicated are zero (0.00)):

| Surf. | K | A4 | A6 |
|---|---|---|---|
| 1 | 0.0 | $-0.38279 \times 10^{-1}$ | $0.25824 \times 10^{-1}$ |
| 2 | 0.0 | $0.24660 \times 10^{-1}$ | $-0.63501 \times 10^{-3}$ |
| 3 | 0.0 | $0.10583 \times 10^{-1}$ | $0.18867 \times 10^{-2}$ |
| 4 | 0.0 | $-0.36901 \times 10^{-1}$ | $0.19504 \times 10^{-1}$ |

TABLE 5-continued

| | | | |
|---|---|---|---|
| 5 | 0.0 | −0.40259 × 10⁻¹ | 0.43993 × 10⁻² |
| 6 | −1.0 | −0.26915 × 10⁻¹ | 0.21588 × 10⁻² |

| Surf. | A8 | A10 |
|---|---|---|
| 1 | −0.28497 × 10⁻¹ | 0.50111 × 10⁻² |
| 2 | −0.36040 × 10⁻² | — |
| 3 | −0.15883 × 10⁻² | −0.42405 × 10⁻³ |
| 4 | −0.48178 × 10⁻² | 0.32597 × 10⁻³ |
| 5 | −0.21861 × 10⁻³ | — |
| 6 | −0.83583 × 10⁻⁴ | — |

Embodiment 6

FIG. 11 is the lens arrangement of the imaging optical system, according to the sixth embodiment of the present invention. FIGS. 12A through 12D show aberrations occurred in the lens arrangement of FIG. 11, when an object at infinity is in an in-focus state. Table 6 shows the numerical data of the sixth embodiment.

The lens arrangement and the positions of the aspherical surfaces are the same as those of the fifth embodiment.

Also, similar to the fifth embodiment, the positive first lens element 11 and the negative second lens element 12 are made of a resin material.

TABLE 6

FNo = 1:3.5
f = 6.20
W = 30.3°
fB = 1.52

| Surf. No. | r | d | Nd | ν |
|---|---|---|---|---|
| Aperture Stop | ∞ | 0.20 | | |
| 1* | 8.141 | 1.63 | 1.50915 | 56.4 |
| 2* | −1.864 | 0.10 | | |
| 3* | −9.416 | 1.65 | 1.58547 | 29.9 |
| 4* | 2.943 | 1.23 | | |
| 5* | 3.422 | 1.60 | 1.50915 | 56.4 |
| 6* | 2.872 | 0.89 | | |
| 7 | ∞ | 0.50 | 1.51633 | 64.1 |
| 8 | ∞ | — | | |

The symbol * designates the aspherical surface which is rotationally symmetrical with respect to the optical axis.
Aspherical surface data (the aspherical surface coefficients not indicated are zero (0.00)):

| Surf. | K | A4 | A6 |
|---|---|---|---|
| 1 | 0.0 | −0.37978 × 10⁻¹ | 0.22265 × 10⁻¹ |
| 2 | 0.0 | 0.32413 × 10⁻¹ | −0.13023 × 10⁻² |
| 3 | 0.0 | 0.18276 × 10⁻¹ | 0.50001 × 10⁻² |
| 4 | 0.0 | −0.33804 × 10⁻¹ | 0.20815 × 10⁻¹ |
| 5 | 0.0 | −0.41021 × 10⁻¹ | 0.48889 × 10⁻² |
| 6 | −1.0 | −0.25496 × 10⁻¹ | 0.20305 × 10⁻² |

| Surf. | A8 | A10 |
|---|---|---|
| 1 | −0.27987 × 10⁻¹ | 0.73942 × 10⁻² |
| 2 | −0.29863 × 10⁻² | — |
| 3 | −0.40918 × 10⁻² | 0.20002 × 10⁻³ |
| 4 | −0.47913 × 10⁻² | 0.30941 × 10⁻³ |
| 5 | −0.24134 × 10⁻³ | — |
| 6 | −0.75019 × 10⁻⁴ | — |

Embodiment 7

FIG. 13 is the lens arrangement of the imaging optical system, according to the seventh embodiment of the present invention. FIGS. 14A through 14D show aberrations occurred in the lens arrangement of FIG. 13, when an object at infinity is in an in-focus state. Table 7 shows the numerical data of the seventh embodiment.

The lens arrangement of the seventh embodiment is the same as the fifth embodiment except for the following:

The second lens element 12 is made of glass; and

The meniscus third lens element 13 (the second lens group 20) is constituted by a positive meniscus lens element having the convex surface facing toward the object.

TABLE 7

FNo = 1:3.5
f = 6.00
W = 31.3°
fB = 1.52

| Surf. No. | r | d | Nd | ν |
|---|---|---|---|---|
| Aperture Stop | ∞ | 0.20 | | |
| 1* | 6.209 | 1.72 | 1.50915 | 56.4 |
| 2* | −2.005 | 0.10 | | |
| 3* | −13.279 | 1.46 | 1.68893 | 31.1 |
| 4* | 3.234 | 1.12 | | |
| 5* | 2.895 | 1.71 | 1.50915 | 56.4 |
| 6* | 2.545 | 0.89 | | |
| 7 | ∞ | 0.50 | 1.51633 | 64.1 |
| 8 | ∞ | — | | |

The symbol * designates the aspherical surface which is rotationally symmetrical with respect to the optical axis.
Aspherical surface data (the aspherical surface coefficients not indicated are zero (0.00)):

| Surf. | K | A4 | A6 |
|---|---|---|---|
| 1 | 0.0 | −0.25873 × 10⁻¹ | −0.28462 × 10⁻² |
| 2 | 0.0 | 0.32958 × 10⁻¹ | −0.58436 × 10⁻³ |
| 3 | 0.0 | 0.14558 × 10⁻¹ | 0.37882 × 10⁻² |
| 4 | 0.0 | −0.41490 × 10⁻¹ | 0.25845 × 10⁻¹ |
| 5 | 0.0 | −0.54107 × 10⁻¹ | 0.68140 × 10⁻² |
| 6 | −1.0 | −0.30988 × 10⁻¹ | 0.28413 × 10⁻² |

| Surf. | A8 | A10 |
|---|---|---|
| 1 | 0.12871 × 10⁻¹ | −0.13999 × 10⁻¹ |
| 2 | −0.57790 × 10⁻² | — |
| 3 | −0.25278 × 10⁻² | −0.75228 × 10⁻³ |
| 4 | −0.64286 × 10⁻² | 0.47479 × 10⁻³ |
| 5 | −0.49791 × 10⁻³ | — |
| 6 | −0.12500 × 10⁻³ | — |

Embodiment 8

FIG. 15 is the lens arrangement of the imaging optical system, according to the eighth embodiment of the present invention. FIGS. 16A through 16D show aberrations occurred in the lens arrangement of FIG. 15, when an object at infinity is in an in-focus state. Table 8 shows the numerical data of the eighth embodiment.

The lens arrangement and the positions of the aspherical surfaces are the same as those of the seventh embodiment except for the following:

The positive first lens element 11 and the meniscus third lens element 13 are made of glass; and The negative second lens element 12 is made of a resin material.

TABLE 8

FNo = 1:3.2
f = 4.40
W = 31.8°
fB = 1.41

| Surf. No. | r | d | Nd | ν |
|---|---|---|---|---|
| Aperture Stop | ∞ | 0.20 | | |
| 1* | 4.801 | 1.50 | 1.69100 | 56.3 |
| 2* | −2.569 | 0.10 | | |
| 3* | −12.594 | 0.75 | 1.58547 | 29.9 |
| 4* | 2.180 | 0.84 | | |
| 5* | 2.134 | 1.15 | 1.52538 | 56.3 |
| 6* | 2.599 | 0.87 | | |
| 7 | ∞ | 0.36 | 1.51633 | 64.1 |
| 8 | ∞ | — | | |

The symbol * designates the aspherical surface which is rotationally symmetrical with respect to the optical axis.

Aspherical surface data (the aspherical surface coefficients not indicated are zero (0.00)):

| Surf. | K | A4 | A6 |
|---|---|---|---|
| 1 | 0.0 | $-0.17878 \times 10^{-1}$ | $-0.17766 \times 10^{-1}$ |
| 2 | 0.0 | $-0.20861 \times 10^{-1}$ | $-0.52345 \times 10^{-2}$ |
| 3 | 0.0 | $-0.46584 \times 10^{-1}$ | $0.38310 \times 10^{-1}$ |
| 4 | 0.0 | $-0.88855 \times 10^{-1}$ | $0.77803 \times 10^{-1}$ |
| 5 | 0.0 | $-0.74397 \times 10^{-1}$ | $0.10468 \times 10^{-2}$ |
| 6 | 0.0 | $-0.43891 \times 10^{-1}$ | $-0.14274 \times 10^{-2}$ |

| Surf. | A8 | A10 |
|---|---|---|
| 1 | $-0.34390 \times 10^{-2}$ | — |
| 3 | $-0.20183 \times 10^{-1}$ | $0.54559 \times 10^{-2}$ |
| 4 | $-0.33168 \times 10^{-1}$ | $0.66290 \times 10^{-2}$ |

Embodiment 9

FIG. 17 is the lens arrangement of the imaging optical system, according to the ninth embodiment of the present invention. FIGS. 18A through 18D show aberrations occurred in the lens arrangement of FIG. 17, when an object at infinity is in an in-focus state. Table 9 shows the numerical data of the ninth embodiment.

The lens arrangement and the positions of the aspherical surfaces are the same as those of the first embodiment except for the following:

The object-side surface (surface No. 1) of the positive first lens element 11 is formed in a concave shape in the close vicinity of the optical axis, so that the positive first lens element 11 is formed as a positive meniscus lens element having the convex surface facing toward the image; and The plane-parallel plate G provided between the meniscus third lens element 13 and the imaging surface is made thicker than the plane-parallel plate G of the first through eight embodiments.

Note that the ninth embodiment is an example of attaining a longer back focal distance, such as 2.21.

TABLE 9

FNo = 1:3.5
f = 6.23
W = 30.7°
fB = 2.21

| Surf. No. | r | d | Nd | ν |
|---|---|---|---|---|
| Aperture Stop | ∞ | 0.42 | | |
| 1* | −145.000 | 1.86 | 1.69100 | 56.3 |
| 2 | −2.612 | 0.21 | | |
| 3* | 5.167 | 1.08 | 1.83291 | 24.1 |
| 4* | 1.985 | 1.35 | | |
| 5* | 4.414 | 1.60 | 1.52538 | 56.3 |
| 6* | 8.231 | 0.72 | | |
| 7 | ∞ | 1.80 | 1.51633 | 64.1 |
| 8 | ∞ | — | | |

The symbol * designates the aspherical surface which is rotationally symmetrical with respect to the optical axis.

Aspherical surface data (the aspherical surface coefficients not indicated are zero (0.00)):

| Surf. | K | A4 | A6 |
|---|---|---|---|
| 1 | 0.0 | $-0.10811 \times 10^{-1}$ | $-0.13669 \times 10^{-1}$ |
| 3 | 0.0 | $-0.22563 \times 10^{-1}$ | $0.98063 \times 10^{-2}$ |
| 4 | 0.0 | $-0.60147 \times 10^{-1}$ | $0.16477 \times 10^{-1}$ |
| 5 | 0.0 | $-0.18175 \times 10^{-1}$ | $0.10404 \times 10^{-2}$ |
| 6 | 0.0 | $-0.84159 \times 10^{-2}$ | $0.69175 \times 10^{-4}$ |

| Surf. | A8 | A10 |
|---|---|---|
| 1 | $0.45139 \times 10^{-2}$ | — |
| 3 | $-0.18794 \times 10^{-2}$ | $0.16576 \times 10^{-3}$ |
| 4 | $-0.35653 \times 10^{-2}$ | $0.73989 \times 10^{-4}$ |

Embodiment 10

FIG. 19 is the lens arrangement of the imaging optical system, according to the tenth embodiment of the present invention. FIGS. 20A through 20D show aberrations occurred in the lens arrangement of FIG. 19, when an object at infinity is in an in-focus state. Table 10 shows the numerical data of the tenth embodiment.

The lens arrangement and the positions of the aspherical surfaces are the same as those of the ninth. Furthermore, the thickness of the plane-parallel plate G is the same as the thickness thereof in the ninth embodiment.

TABLE 10

FNo = 1:3.5
f = 6.80
W = 28.4°
fB = 2.58

| Surf. No. | r | d | Nd | ν |
|---|---|---|---|---|
| Aperture Stop | ∞ | 0.65 | | |
| 1* | −980.000 | 1.88 | 1.69100 | 56.3 |
| 2 | −2.860 | 0.27 | | |
| 3* | 5.272 | 1.11 | 1.83291 | 24.1 |

TABLE 10-continued

| | | | | |
|---|---|---|---|---|
| 4* | 2.050 | 1.36 | | |
| 5* | 4.593 | 1.60 | 1.52538 | 56.3 |
| 6* | 9.317 | 1.09 | | |
| 7 | ∞ | 1.80 | 1.51633 | 64.1 |
| 8 | ∞ | — | | |

The symbol * designates the aspherical surface which is rotationally symmetrical with respect to the optical axis.
Aspherical surface data (the aspherical surface coefficients not indicated are zero (0.00)):

| Surf. | K | A4 | A6 | A8 | A10 |
|---|---|---|---|---|---|
| 1 | 0.0 | $-0.91278 \times 10^{-2}$ | $-0.94643 \times 10^{-2}$ | $0.26166 \times 10^{-2}$ | — |
| 3 | 0.0 | $-0.20197 \times 10^{-1}$ | $0.99087 \times 10^{-2}$ | $-0.18990 \times 10^{-2}$ | $0.15109 \times 10^{-3}$ |
| 4 | 0.0 | $-0.56193 \times 10^{-1}$ | $0.16999 \times 10^{-1}$ | $-0.34398 \times 10^{-2}$ | $0.82800 \times 10^{-4}$ |
| 5 | 0.0 | $-0.19607 \times 10^{-1}$ | $0.12978 \times 10^{-2}$ | | |
| 6 | 0.0 | $-0.90566 \times 10^{-2}$ | $0.14388 \times 10^{-3}$ | | |

The numerical values of each embodiment for each condition are shown in Table 11.

TABLE 11

| | Embod. 1 | Embod. 2 | Embod. 3 | Embod. 4 | Embod. 5 |
|---|---|---|---|---|---|
| Cond. (1) | 0.720 | 0.736 | 0.850 | 0.756 | 0.796 |
| Cond. (2) | 1.192 | 1.192 | 1.334 | 1.245 | 1.170 |
| Cond. (3) | 0.449 | 0.436 | 0.472 | 0.544 | 0.323 |
| Cond. (4) | 0.350 | 0.341 | 0.326 | 0.402 | 0.437 |
| Cond. (5) | 0.291 | 0.289 | 0.316 | 0.271 | 0.220 |
| Cond. (6) | 0.191 | 0.189 | 0.582 | 0.287 | −0.018 |
| Cond. (7) | 0.819 | 0.832 | 0.741 | 0.737 | 0.557 |

| | Embod. 6 | Embod. 7 | Embod. 8 | Embod. 9 | Embod. 10 |
|---|---|---|---|---|---|
| Cond. (1) | 0.864 | 0.879 | 0.848 | 0.837 | 0.868 |
| Cond. (2) | 1.186 | 1.288 | 1.431 | 1.360 | 1.402 |
| Cond. (3) | 0.301 | 0.334 | 0.584 | 0.419 | 0.421 |
| Cond. (4) | 0.475 | 0.539 | 0.495 | 0.319 | 0.301 |
| Cond. (5) | 0.198 | 0.187 | 0.190 | 0.217 | 0.201 |
| Cond. (6) | −0.004 | 0.121 | 0.514 | 0.535 | 0.618 |
| Cond. (7) | 0.552 | 0.483 | 0.485 | 0.708 | 0.675 |

As can be understood from Table 11, the numerical values of each embodiment satisfy each of conditions (1) through (7), and as shown in the aberration diagrams, the various aberrations are well corrected.

According to the above description, a compact high-quality imaging optical system which are incorporated in digital cameras and the portable devices can attain the following features:

a fast aperture ratio of 1:2.8 through 3.5;

a half angle-of-view of 30° or more;

imaging performance which can sufficiently copes with a solid-state image sensor with higher resolution;

a shorter length of the entire imaging optical system with a simple structure thereof; and lower manufacturing costs.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging optical system comprises an aperture stop, a positive first lens group, and a positive or negative second lens group, in this order from an object, wherein said positive first lens group comprises a positive first lens element and a negative second lens element, in this order from the object, said positive first lens element having its most image-side surface as a convex surface facing toward an image side, and said negative second lens element having its most image-side surface as a concave surface facing toward the image side;

wherein said second lens group comprises a meniscus third lens element;

wherein said meniscus third lens element comprises an aspherical surface on an object-side surface and an image-side surface thereof, and has the convex surface facing toward the object in the vicinity of the optical axis;

wherein said positive first lens element of said positive first lens group is provided with an aspherical surface on at least the object-side surface thereof;

wherein said aspherical surface of said positive first lens element is formed so that the higher a height from the optical axis in a radial direction becomes, the more an aspherical surface at the height is displaced toward the object, compared with a paraxial spherical surface; and wherein said imaging optical system satisfies the following conditions:

$$0.6 < |f_1/f_2| < 1.0$$

$$1.0 < f_{12}/f < 1.6$$

$$0.301 \leq |R_2/f| < 0.7$$

wherein f designates the focal length of said entire imaging optical system;

$f_1$ designates the focal length of said positive first lens element;

$f_2$ designates the focal length of said negative second lens element;

$f_{12}$ designates the focal length of said positive first lens group; and $R_2$ designates the radius of curvature of the image-side surface of said positive first lens element.

2. The imaging optical system according to claim 1, wherein said negative second lens element of said positive first lens group is provided with an aspherical surface on at least the image-side surface thereof;

wherein said aspherical surface of said image-side surface of said negative second lens element is formed so that the higher a height from the optical axis in a radial direction becomes, the more an aspherical surface at the height is displaced toward the object, compared with a paraxial spherical surface; and wherein said imaging optical system satisfies the following conditions:

$0.2<R_4/f<0.7$ $0.15<D/f<0.4$ wherein $R_4$ designates the radius of curvature of the image-side surface of said negative second lens element; and D designates the distance between said positive first lens group and said second lens group.

3. The imaging optical system according to claim 1, further satisfying the following condition:

$-0.1<f_{12}/f_3<0.7$ wherein $f_{12}$ designates the focal length of said positive first lens group; and $f_3$ designates the focal length of said meniscus third lens element.

4. The imaging optical system according to claim 1, wherein said meniscus third lens element of said second lens group is made of a resin lens material;

wherein said object-side aspherical surface of said meniscus third lens element is formed so that the higher a height from the optical axis in a radial direction becomes the weaker the positive refractive power is, compared with a paraxial spherical surface;

wherein said image-side aspherical surface of said meniscus third lens element is formed so that the higher a height from the optical axis in a radial direction becomes the weaker the negative refractive power is, compared with a paraxial spherical surface; and the peripheral area of the image-side surface of said meniscus third lens element is arranged to generate a positive refractive power instead of the negative refractive power; and wherein said meniscus third lens element of said second lens group satisfies the following condition:

$0.4<R_5/f<1.0$ wherein $R_5$ designates the radius of curvature of the paraxial spherical surface on the object-side surface of said meniscus third lens element; and f designates the focal length of said entire imaging optical system.

5. An imaging optical system comprising: an aperture stop; a positive first lens group; and a positive or negative second lens group, in this order from an object, wherein said positive first lens group comprises a positive first lens element and a negative second lens element, in this order from the object, said negative second lens element provided with an aspherical surface on at least the image-side surface of said negative second lens element;

wherein said second lens group comprises a meniscus third lens element;

wherein said meniscus third lens element comprises an aspherical surface on an object-side surface and an image-side lens surface of said third lens element, and has the convex surface facing toward the object in the vicinity of the optical axis;

wherein said positive first lens element of said positive first lens group is provided with an aspherical surface on at least the object-side surface thereof;

wherein said aspherical surface of said positive first lens element is formed such that the higher a height from the optical axis in a radial direction becomes, the more an aspherical surface at the height is displaced toward the object, compared with a paraxial spherical surface; and wherein said imaging optical system satisfies the following conditions:

$0.6<|f_1/f_2|<1.0$ $1.0<f_{12}/f<1.6$ $0.301 \leq |R_2/f|<0.7$ $0.2<R_4/f<0.7$ $0.15<D/f<0.4$ wherein f designates the focal length of said entire imaging optical system;

$f_1$ designates the focal length of said positive first lens element;

$f_2$ designates the focal length of said negative second lens element;

$f_{12}$ designates the focal length of said positive first lens group;

$R_2$ designates the radius of curvature of the image-side surface of said positive first lens element;

$R_4$ designates the radius of curvature of the image-side surface of said negative second lens element; and D designates the distance between said positive first lens group and said second lens group.

6. The imaging optical system according to claim 5, further satisfying the following condition:

$-0.1<f_{12}/f_3<0.7$ wherein $f_{12}$ designates the focal length of said positive first lens group; and $f_3$ designates the focal length of said meniscus third lens element.

7. The imaging optical system according to claim 5, wherein said meniscus third lens element of said second lens group is made of a resin lens material;

wherein said object-side aspherical surface of said meniscus third lens element is formed so that the higher a height from the optical axis in a radial direction becomes the weaker the positive refractive power is, compared with a paraxial spherical surface;

wherein said image-side aspherical surface of said meniscus third lens element is formed so that the higher a height from the optical axis in a radial direction becomes the weaker the negative refractive power is, compared with a paraxial spherical surface; and the peripheral area of the image-side surface of said meniscus third lens element is arranged to generate a positive refractive power instead of the negative refractive power; and wherein said meniscus third lens element of said second lens group satisfies the following condition:

$0.4<R_5/f<1.0$ wherein $R_5$ designates the radius of curvature of the paraxial spherical surface on the object-side surface of said meniscus third lens element; and f designates the focal length of said entire imaging optical system.

* * * * *